United States Patent
Morito et al.

(10) Patent No.: US 7,138,915 B2
(45) Date of Patent: Nov. 21, 2006

(54) HANDLING SUPPORT METHOD AND HANDLING SUPPORT SYSTEM

(75) Inventors: Hajime Morito, Yokohama (JP); Yasuko Fukuzawa, Yokohama (JP); Kazuo Takaragi, Ebina (JP); Shojiro Asai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 765 days.

(21) Appl. No.: 10/304,855

(22) Filed: Nov. 27, 2002

(65) Prior Publication Data

US 2003/0105853 A1 Jun. 5, 2003

(51) Int. Cl.
*G08B 13/14* (2006.01)

(52) U.S. Cl. ............. 340/572.1; 340/539; 340/540; 340/691.1; 379/37; 379/44

(58) Field of Classification Search ........... 340/539, 340/540, 572.1, 572.4, 691.1, 691.6, 692, 340/825.49; 379/37, 38, 44, 51
See application file for complete search history.

(56) References Cited

U.S. PATENT DOCUMENTS 5,892,441 A * 4/1999 Woolley et al. ...... 340/539.26
6,933,849 B1 * 8/2005 Sawyer ................ 340/572.4
6,998,985 B1 * 2/2006 Reisman et al. ......... 340/573.1
2002/0089423 A1 * 7/2002 Przygoda, Jr. ............. 340/540

FOREIGN PATENT DOCUMENTS

| JP | 09-253164 | 9/1997 |
| JP | 10-111877 | 4/1998 |
| JP | 11-296581 | 10/1999 |
| JP | 2000-047707 | 2/2000 |
| JP | 2001-225925 | 8/2001 |
| JP | 2001-240217 | 9/2001 |
| JP | 2001-249987 | 9/2001 |
| JP | 2001-315922 | 11/2001 |
| JP | 2001-325360 | 11/2001 |

* cited by examiner

*Primary Examiner*—Jeffery Hofsass
*Assistant Examiner*—Samuel J. Walk
(74) *Attorney, Agent, or Firm*—Mattingly, Stanger, Malur & Brundidge, P.C.

(57) ABSTRACT

Object management in a distributed system includes at least one attribute information management server for managing attribute information of the object in correspondence with identification information given to the object, at least one identification information management server for managing the attribute information management server in correspondence with the identification information, and at least one supporting server for supporting handling of the object in accordance with the attribute information is connected to a user terminal over a network.

17 Claims, 15 Drawing Sheets

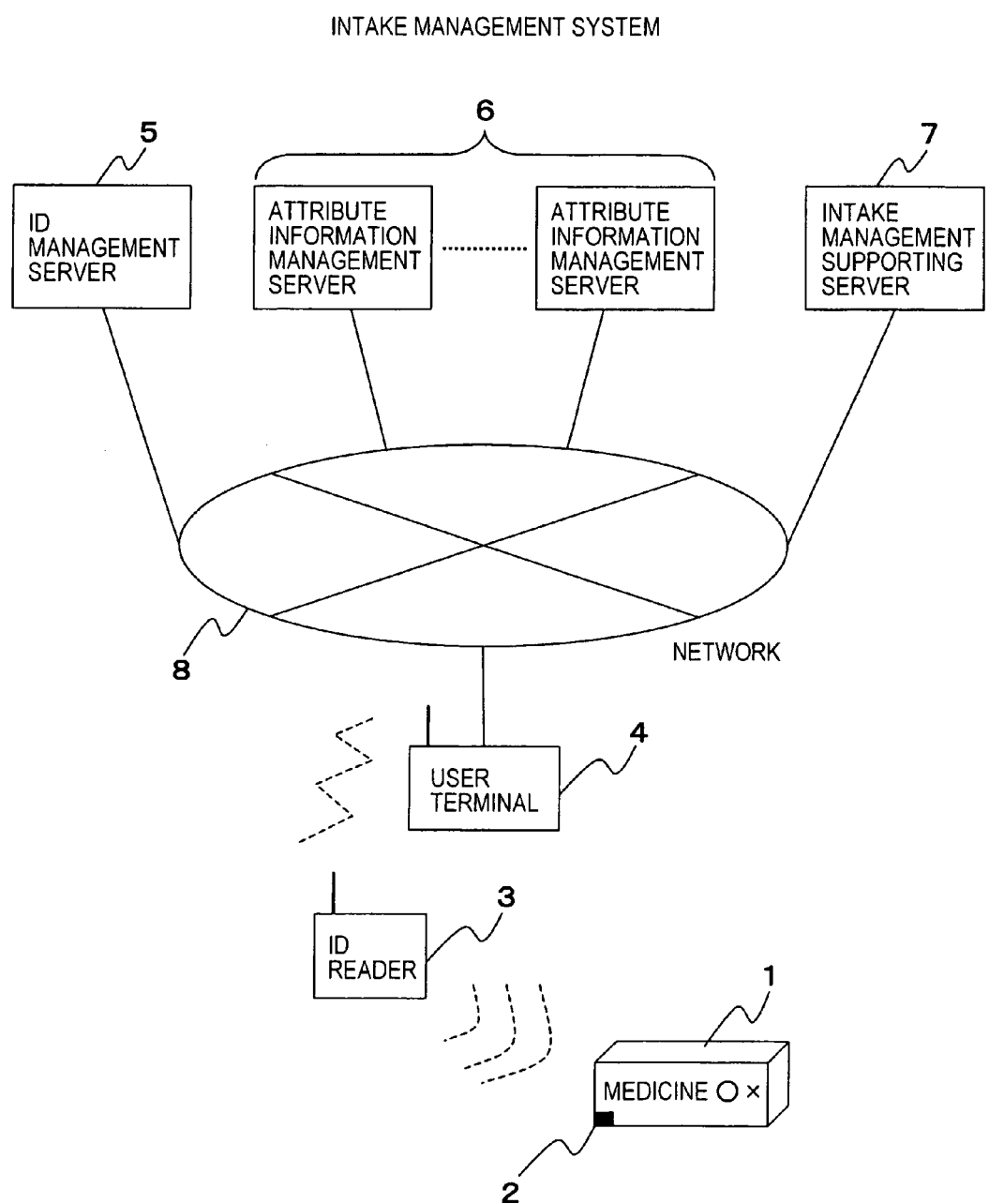

ID READER3

USER TERMINAL 4

ATTRIBUTE INFORMATION MANAGEMENT SERVER 6

ATTRIBUTE INFORMATION DB 602

| 6021 | 6022 |
|---|---|
| CATEGORY CODES | ATTRIBUTE INFORMATION |
| **** | ****** |
| **** | ****** |
| **** | ****** |
| ⋮ | ⋮ |

ID MANAGEMENT SERVER 5

ADDRESS DB 502

| MANUFACTURER CODES 5021 | CONTACT ADDRESSES 5022 |
|---|---|
| **** | ****** |
| **** | ****** |
| **** | ****** |
| ⋮ | ⋮ |

INTAKE MANAGEMENT SUPPORTING SERVER 7

INTAKE ACTION HISTORY DB 702

FIG.12

USER INFORMATION DB 703

| USER ID | USER INFORMATION |
|---------|------------------|
| 7031    | 7032             |
| ****    | *****            |
| ****    | *****            |
| ****    | *****            |
| ⋮       | ⋮                |

FIG.13

HANDLING RULE DB 704

| ATTRIBUTE INFORMATION | HANDLING RULES |
|-----------------------|----------------|
| 7041                  | 7042           |
| ****                  | *****          |
| ****                  | *****          |
| ****                  | *****          |
| ⋮                     | ⋮              |

IMPORT/EXPORT MANAGEMENT SUPPORTING SERVER 7'

DISTRIBUTION ACTION HISTORY DB 702'

| ACTION DATE AND TIME | ACTION TYPE | IMPORTED/EXPORTED COUNTRY |
|---|---|---|
| //** | IMPORT | COUNTRY A |
| //** | EXPORT | COUNTRY A |
| ⋮ | ⋮ | ⋮ |

ID CODE : ******

LOCATION MANAGEMENT SUPPORTING SERVER 7"

LOCATION HISTORY DB 702"

HANDLING SUPPORT METHOD AND HANDLING SUPPORT SYSTEM

The present invention relates to a technology for supporting handling an object by using identification information, which is given to the object.

Recently, needs for solution systems have been raised more and more in various business fields such as healthcare, medical care, manufacture, distribution, finance, transportation and so on. For example, in the business fields such as healthcare and medical care, a solution system is desired for managing an action of taking a substance for each user. In the business fields such as manufacture and distribution, a solution system is desired for managing a distribution action for each item. In the business fields such as finance and transportation, a solution system is desired for monitoring a fraud act (such as a use of a forged ticket) by a user.

In order to achieve these solution systems, a mechanism is needed which can identify each object and can communicate a message regarding handling of the identified object to a user.

SUMMARY OF THE INVENTION

The present invention was made in view of the above situation, and it is an object of the present invention to provide a technology for supporting handling of an object, which can be applied to various solution systems.

The present invention gives identification information to each object and, in advance, registers and manages attribute information of the object to which the identification information is given. Then, the object is identified by using the identification information given to the object and specifies a message regarding handling of the object in accordance with the attribute information of the object and communicate it to a user.

More specifically, a distributed system including at least one attribute information management server for managing attribute information of the object in correspondence with identification information given to the object, at least one identification information management server for managing the attribute information management server in correspondence with the identification information, and at least one supporting server for supporting handling of the object in accordance with the attribute information is connected to a user terminal over a network.

Then, based on identification information obtained by the user terminal, the identification information management server specifies an address of the attribute information management server for managing attribute information of the object to which the identification information is given. The attribute information management server specifies attribute information of the object to which the identification information is given The supporting server creates and notifies to the user terminal, support information relating to handling in accordance with the object attribute information specified by the attribute information management server.

Here, the identification information can be given to an object as follows: A Radio Frequency Identification (RFID) electronic circuit chip storing identification information given to the object may be attached to a container or an attachment of the object or the object itself. Then, an RFID reading device having a function of communicating with the user terminal is used to read the identification information from the RFID electronic circuit chip existing in a receivable radio area. Then, the identification information is sent to the user terminal.

The RFID electronic circuit chip has an unrewritable memory area, and information may be stored in the unrewritable memory.

Here, in order to improve the security in a radio section (between the RFID electronic circuit chip and the RFID reading device), the identification information may be held in the RFID electronic circuit chip along with the authentication information of the identification information. Then, the RFID reading device is caused to read the identification information along with the authentication information from the RFID electronic circuit chip and to send them to the user terminal. Then, in the user terminal, the identification information is authenticated by using the authentication information. If the authentication is established, the identification information is notified to the identification information management server.

As described above, according to the present invention, identification information is given to each object, and the object can be identified by using the identification information. Then, a message regarding handling in accordance with attribute information of the identified object is communicated to the user. Therefore, the present invention can be applied in various solution systems.

BRIEF DESCRIPTION OF THE DRAWINGS

FIG. 1 is a schematic diagram of an intake management system to which a first embodiment of the present invention is applied;

FIG. 12 is a diagram showing a registered content example of user information DB 703 shown in FIG. 10;

FIG. 13 is a diagram showing a registered content example of a handling rule DB704 shown in FIG. 10;

DESCRIPTION OF THE PREFERRED EMBODIMENTS

First of all, as a first embodiment of the present invention, a case will be described where the present invention is applied to a solution system (called an intake management system) for managing an action of taking an object of each user in a business field such as healthcare and medical care.

An object in this embodiment is a substance taken to a body, such as a medicine. In this embodiment, an action of taking the substance by a user is monitored. If necessary, a message indicating that a special care for the action is needed is communicated to the user.

FIG. 1 is a schematic diagram of an intake management system to which the first embodiment of the present invention is applied.

As shown, an RFID electronic circuit chip 2 storing an ID, which is unique identification information given to an object, is attached to a container (including wrapping paper) or an attachment (including an explanatory leaflet) of an object 1 such as a medicine.

Figure 2A:
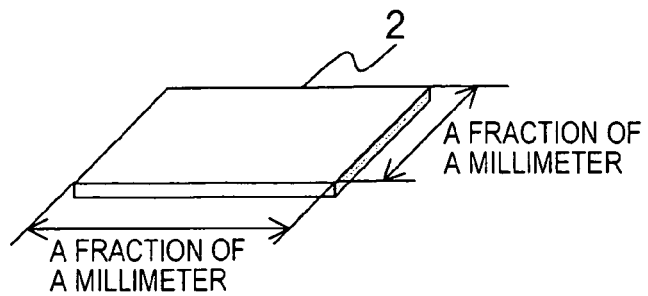
FIGS. 2A to 2C are schematic diagrams of an electronic circuit chip shown in FIG. 1.
Figure 2B:
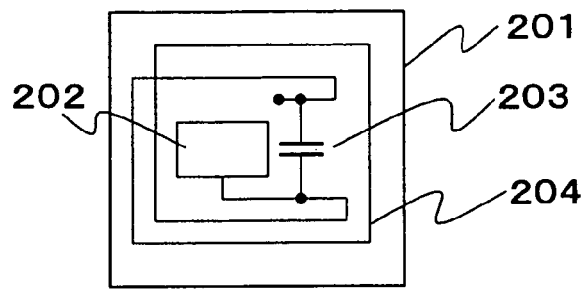

The electronic circuit chip 2 is an electronic circuit chip of a fraction of several millimeter square, which can be manufactured only by a semiconductor manufacturer having sufficient facilities, for example, as shown in FIG. 2A. The electronic circuit chip 2 has a form of a substantial thin rectangular solid. As shown in FIG. 2B, an electronic circuit 202 functioning as a memory and a reading circuit thereof, a capacitor 203 and an antenna 204 are formed on a silicon chip 201. Here, the memory includes an unrewritable memory portion. An ID code, which is identification information unique to each electronic circuit chip 202 is stored in the unrewritable memory portion.

The ID code is in advance stored in the unrewritable memory portion of the electronic circuit 202 by a manufacturer of the electronic circuit chip 2 before shipping the electronic circuit chip 2 to a manufacturer of the object 1 or the relating party (for example, a manufacturer of the container). Here, the unrewritable memory portion of the electronic circuit 202 may be an unrewritable memory such as a ROM, and also a rewritable memory, such as a EEPROM whose area where an ID code is written is set not to be rewritable.

Figure 2C:
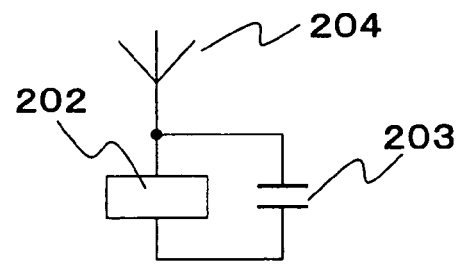

The electronic circuit 202, the capacitor 203 and the antenna 204 form a circuit as shown in FIG. 2C. This circuit induces current in the antenna 204 by using radio waves supplied from the outside and stores the charges in the capacitor 203. Then, information stored in the electronic circuit 202 by using power obtained from the charges stored in the capacitor 203 is sent from the antenna 204 by radio waves. That is, by supplying radio waves to the electronic circuit chip 2, an ID code stored in the electronic circuit 202 in the electronic circuit chip 2 can be read out from the outside without contacting.

Figure 3:
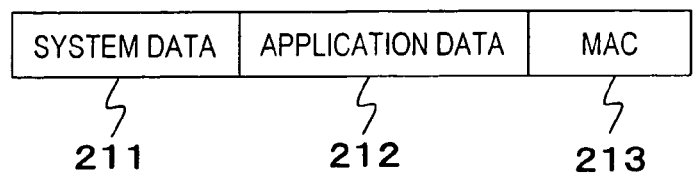
FIG. 3 is a diagram for explaining a format example of an ID code stored in an electronic circuit chip 2 shown in FIG. 2.

Here, a format example of an ID code stored in the electronic circuit chip 2 is shown in FIG. 3. In this example, the ID code includes system data 211, application data 212 and Message Authentication code (MAC) 213. The system data 211 is unique information for identifying a manufacturer of the electronic circuit chip 2 and includes Cyclic Redundancy Checking (CRC) for a serial number and an ID code, for example. The application data 212 is information for identifying a manufacturer of an object and includes for example, a manufacturer code for identifying a manufacturer and a category code for identifying attribute information of the object. The MAC 213 is an authentication code of an ID code and is data obtained by encrypting the system data 211 and the application data 212 with a private key kept in secret by a manufacturer of the electric chip 2 or by creating a digital signature for the system data 211 and the application data 212.

As the electronic circuit chip, an ultra small electronic circuit chip developed by Hitachi, Ltd. may be used.

Referring back to FIG. 1, an ID reader 3 is an RFID reading device, which can be carried by an operator. An ID code is read thereby from the electronic circuit chip 2 existing in a receivable radio area by generating radio waves and then the read ID code is sent to a user terminal 4.

Figure 4:
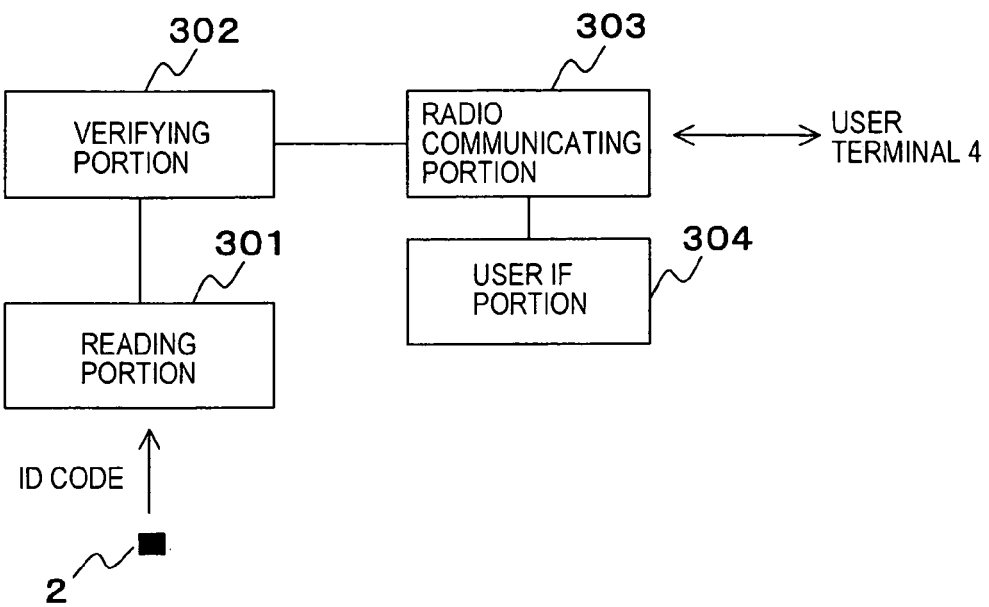
FIG. 4 is a schematic diagram of an ID reader 3 shown in FIG. 1.

FIG. 4 is a schematic configuration diagram of the ID reader 3. As shown, the ID reader 3 includes a reading portion 301, a verifying portion 302, a radio communicating portion 303 and a user interface (IF) portion 304.

The reading portion 301 drives the electronic circuit chip 2 existing in the receivable radio area by sending radio waves. Then, an ID code sent from the electronic circuit chip 2 is real. Here, in order to read the ID code only from the electronic circuit chip 2 given to the object 1 held by the user, the reading portion 301 may be self-contained in, for example, a ring so as to accommodate the receivable radio area within the palm of the hand.

The verifying portion 302 performs an error check on an ID code by using, for example, CRC included in the ID code read by the reading portion 301 from the electronic circuit chip 2. After determining that there is no error, the ID code is verified by using the MAC included in the ID code and a verifying key (a private key of a manufacturer of the electronic circuit chip 2 or the pairing public key), which is registered in advance. Then, when the verification is satisfied, the ID code is passed to the radio communicating portion 303.

The radio communicating portion 303 receives the ID code from the verifying portion 302 and then sends it to the user terminal 4 along with identification information (called reader ID hereinafter) of the ID reader 3, which is registered in advance. In addition, the radio communicating portion 303 sends the information received from the user terminal 4 to the user IF portion 304 or sends the information received from the user IF portion 304 to the user terminal 4.

The user IF portion 304 includes an input device such as an operation button and an output device such as a display device and a voice device. The user IF portion 304 outputs information received from the radio communicating portion 303 to communicate a message to a user, receives an instruction from the user and outputs the instruction to the radio communicating portion 303.

Referring back to FIG. 1, when the user terminal 4 receives the ID code and the reader ID from the ID reader 3, information is exchanged with servers 5 to 7. Thus, when the user would take the object 1 to which the ID code is given, a message relating the intake action is obtained and is sent to the ID reader 3.

Figure 5:
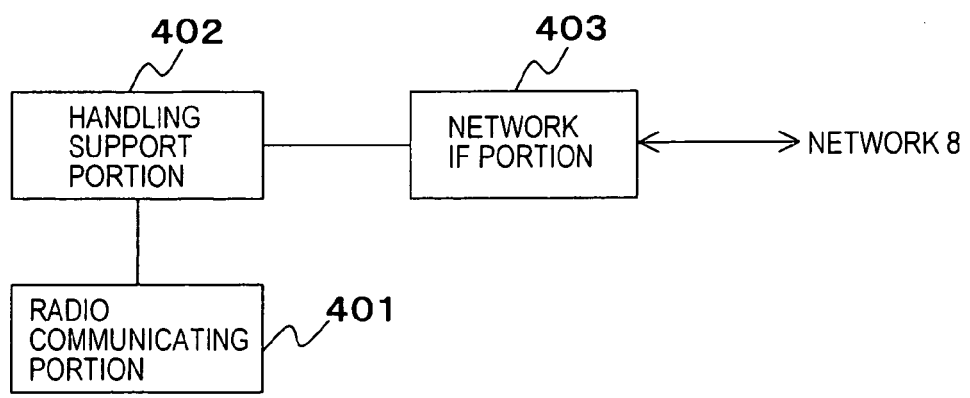
FIG. 5 is a schematic configuration diagram of a user terminal 4 shown in FIG. 1.

FIG. 5 is a schematic configuration diagram of the user terminal 4. As shown, the user terminal 4 includes a radio communicating portion 401, a handling support portion 402 and a network IF portion 403.

The radio communicating portion 401 performs radio communication with the ID reader 3. The radio communicating portion 401 receives an ID code and a reader ID from the ID reader 3 and then sends them to the handling support portion 402. In addition, the radio communicating portion 401 receives information from the handling support portion 402 and then sends them to the ID reader 3 specified by the reader ID, which is notified by the handling support portion 402.

The network IF portion 403 communicates with the servers 5 to 7 over the network 8. In other words, information is received from the servers 5 to 7 and is passed to the handling support portion 402. In addition, information received from the handling support portion 402 is sent to one of the servers 5 to 7 specified by the handling support portion 402.

The handling support portion 402 receives an ID code and a reader ID from the ID reader 3 through the radio communicating portion 401 and then exchanges information with the servers 5 to 7 through the network IF portion 403. In addition, information is exchanged with the ID reader 3 through the radio communicating portion 401. Thus, it can be determined whether or not a user having the ID reader 3 would take the object 1 to which the ID code is given. If the user would take the object 1, a message relating to the intake action is obtained and is sent to the ID reader 3.

Referring back to FIG. 1, the attribute information management server 6 is provided for each manufacture of an object, for example. Then, attribute information of each of objects manufactured by manufacturers, respectively, is managed.

Figures 6, 7:
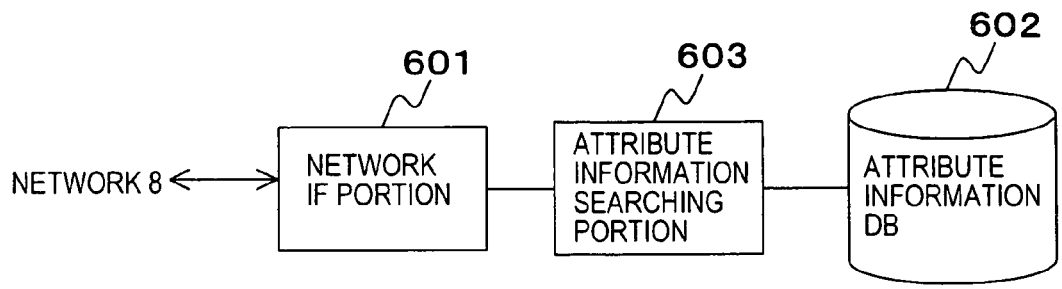
FIG. 6 is a schematic configuration diagram of an attribute information management server 6 shown in FIG. 1.
FIG. 7 is a diagram showing a registered content example of attribute information DB 602 shown in FIG. 6.

FIG. 6 is a schematic configuration diagram of the attribute information management server 6. As shown, the attribute information management server 6 has a network IF portion 601, an attribute information database (DB) 602 and an attribute information searching portion 603.

The network IF portion 601 communicates with the user terminal 4 and servers 5 and 7 over the network 8. As shown in FIG. 7, attribute information 6022 of an object described with respect to the name, effects, components, prescription, notices and so on is registered in the attribute information DB 602 in correspondence with a category code 6021. Here, the category code 6021 is included in application data 212 of an ID code, as described above. The attribute information searching portion 602 extracts attribute information of an object from the attribute information DB 602 by using, as a key, the category code included in the ID code notified by the network IF portion 601.

Referring back to FIG. 1, an ID management server 5 manages an address (destination address) in the attribute information management server 6 for managing ID codes.

Figures 8, 9:
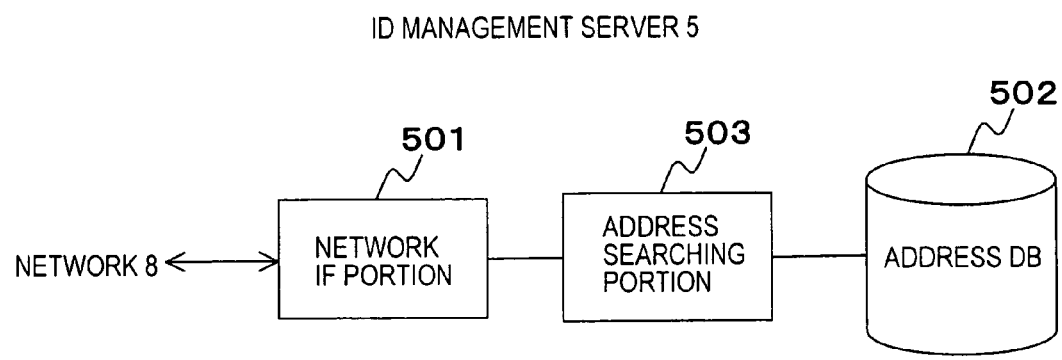
FIG. 8 is a schematic configuration diagram of an ID management server 5 shown in FIG. 1.
FIG. 9 is a diagram showing a registered content example of an address DB 502.

FIG. 8 is a schematic configuration diagram of the ID management server 5. As shown, the ID management server 5 has a network IF portion 501, an address DB 502, and an address searching portion 503.

A network IP portion 501 communicates with the user terminal 4 and the servers 6 and 7 over the network 8. An address 5022 of the attribute information management server 6 is registered in the address DB 502 in correspondence with the manufacturer code 5021, as shown in FIG. 9.

Here, the manufacturer code 5021 is included in the application data 212 of the IF code, as described above. The address searching portion 503 extract the address 5022 of the attribute information management server from the address DB 502 by using, as a key, the manufacturer code 5021 included in the ID code notified by the network IF portion 501.

Referring back to FIG. 1, the intake management supporting server 7 manages a history of an intake action of each user. In addition, a message is sent to a user terminal of a corresponding user with respect to the action that the user would take an object newly.

Figure 10:
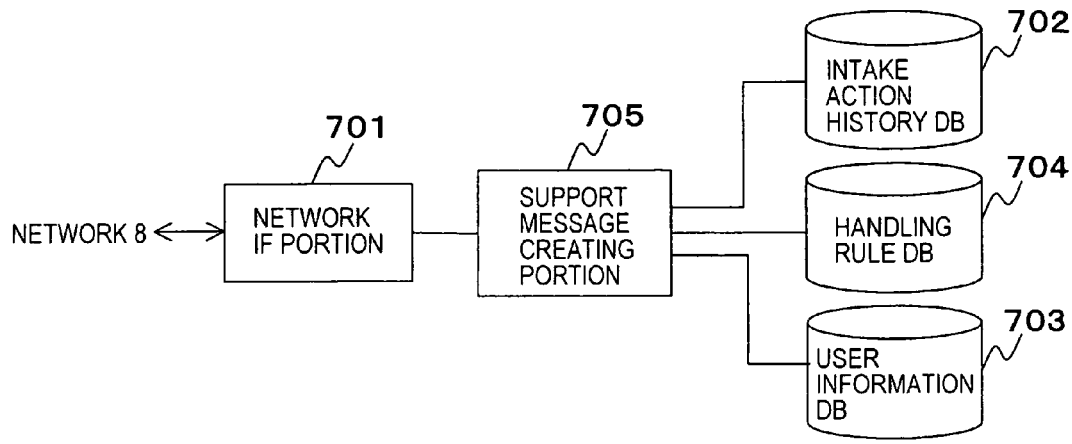
FIG. 10 is a schematic configuration diagram of an intake management supporting server 7 shown in FIG. 1.

FIG. 10 is a schematic configuration diagram of the intake management supporting server 7. As shown, the intake management supporting server 7 has a network IF portion 701, an intake action history DB 702, a user information DB 703, a handling rule DB 704 and a support message creating portion 705.

The network IF portion 701 communicates with the user terminal 4 and the servers 5 and 6 over the network 8.

Figure 11:
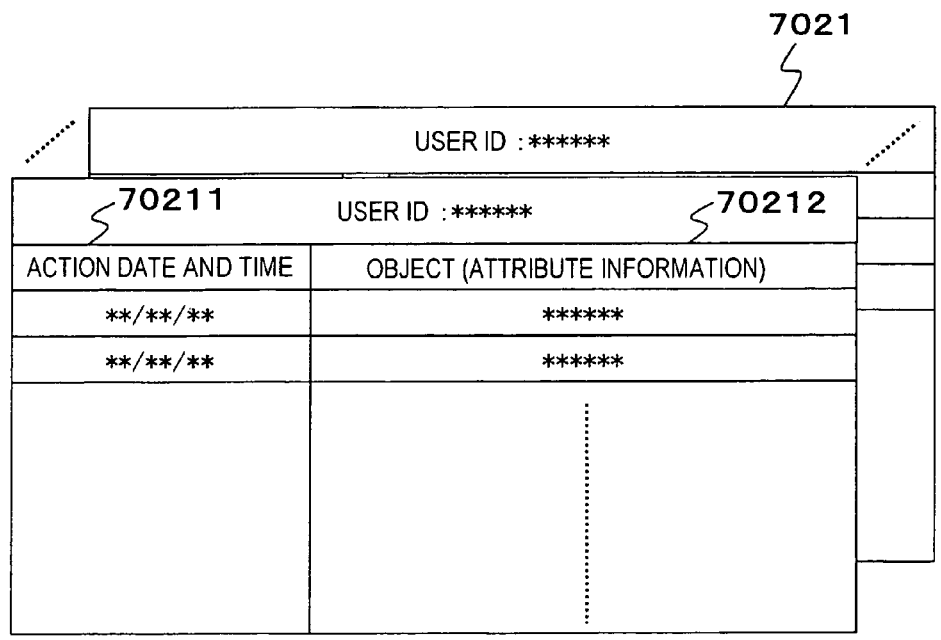
FIG. 11 is a diagram showing a registered content example of an intake action history DB 702 shown in FIG. 10.

An intake action history table 7021 is provided in the intake action history DB 702 for each user identification information (called user ID, hereinafter), as shown in FIG. 11. A record including date and time 70211 of an intake action and attribute information 70212 of an object are registered in the intake action history table 7021 in chronological order.

Information 7032 (information to notice for calling attention to an intake action such as whether or not a user has allergy and/or asthma, which is called user information hereinafter) relating to a user profile is registered in the user information DB 703 in correspondence with a user ID 7031 of the user, as shown in FIG. 12.

Information 7042 regarding notice for calling attention to an intake action (such as a combination of objects to be avoided, a user's physical constitution, sickness history and so on, which is called handling rule hereinafter) is registered in the handling rule DB 704 for each attribute information 7041 of an object, as shown in FIG. 13.

The support message creating portion 705 receives a user ID and attribute information from the attribute information management server 6. Then, the support message creating portion 705 extracts information from the user information DB 703, the intake action history DB 702 and the handling rule DB 704 by using the user ID and the attribute information as a key. Then, the support message creating portion 705 creates a message for the intake action based on the extracted information.

Figure 14:
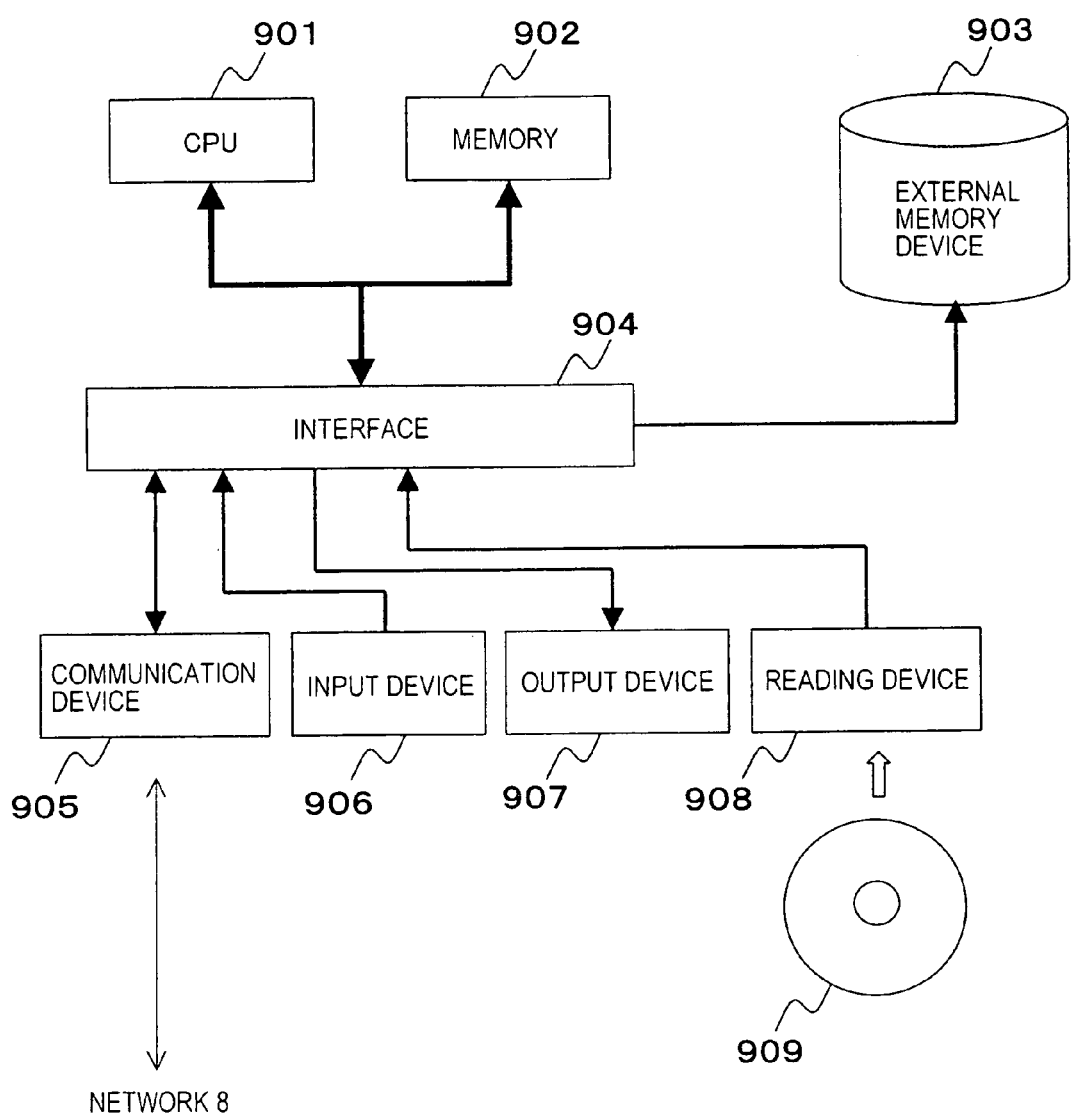
FIG. 14 is a diagram showing a hardware configuration example of devices.

As shown in FIG. 14, the servers 5 to 7 can be implemented when a CPU 901 executes a predetermined program loaded to a memory 902 in a network system formed by connecting to a network a computer system or multiple computer systems each having a general configuration including the CPU 901, the memory 902, an external memory device 903 such as a hard disk device, a reading device 908 for reading data from a memory medium 909 such as a CD-ROM and a DVD-ROM, an input device 906 such as a keyboard and a mouse, an output device 907 such as a monitor, a communication device 905 for communicating with other devices over the network 8, and an interface 904 for exchanging data with these devices. Here, the external memory device 903 or the like may be used as said DBs. The user terminal 4 may be implemented when the CPU 901 executes a predetermined program loaded to the memory 902 in a general computer system having the above-described hardware configuration to which a radio communicating device for the ID reader 3 is provided.

The predetermined program is loaded from the external memory device 903 to the memory 902, from the memory medium 909 to the memory 902 through the reading device 908 or from the network 8 to the memory 902.

Next, an operation of the intake management system will be described.

Figure 15:
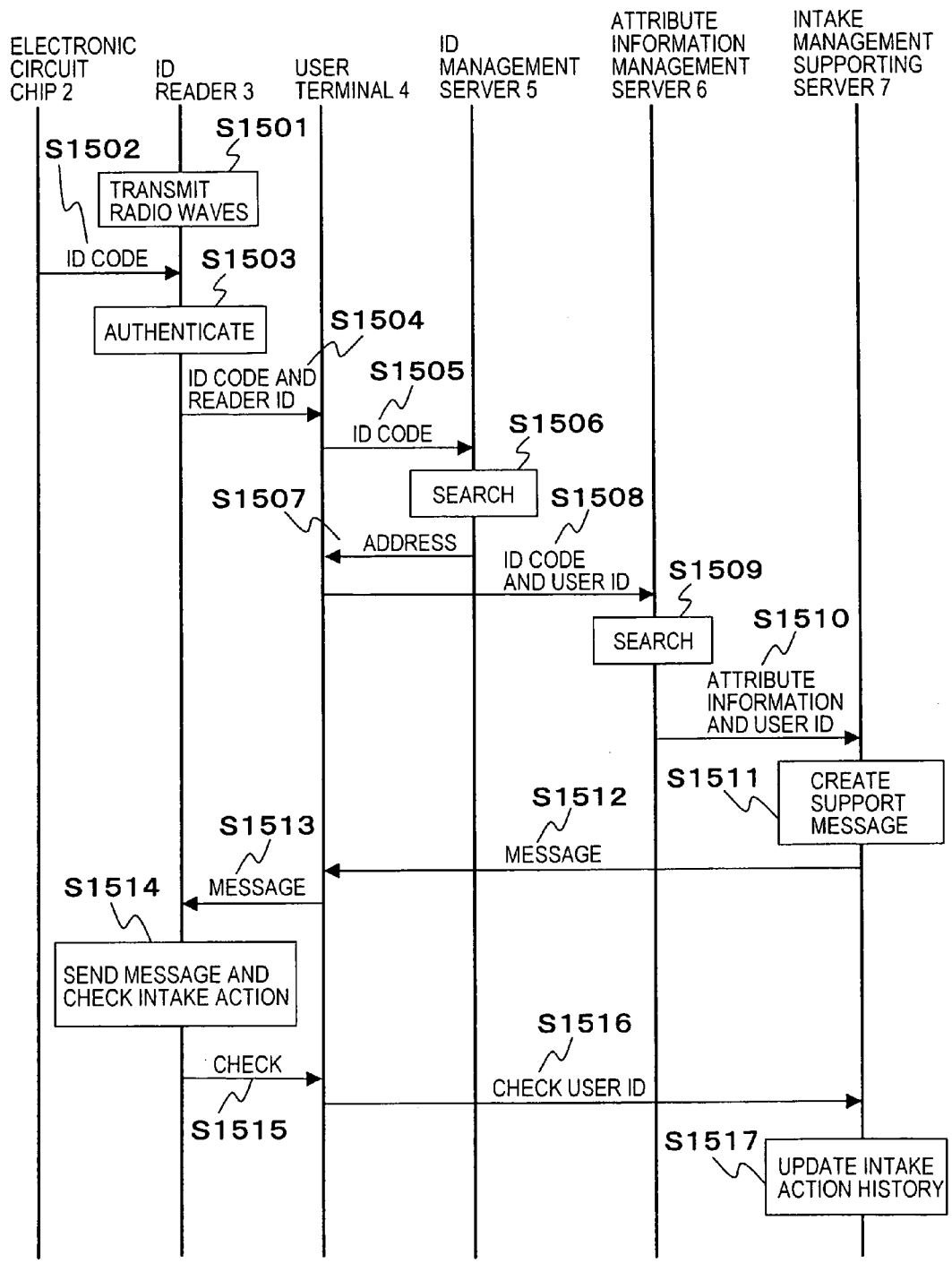
FIG. 15 is a diagram for explaining an operation of the intake management system shown in FIG. 1.

FIG. 15 is a diagram for explaining an operation of the intake management system shown in FIG. 1.

First of all, in the ID reader 3, the reading portion 301 sends out radio waves for reading an ID code all the time (S1501). A user holds the object 1, for example, by his/her hand, and the electronic circuit chip 2 enters to the receivable area of the ID reader 3 carried by the user, Then, the electronic circuit chip 2 is driven. Then, the ID code is read out from the electronic circuit 202 of the electronic circuit chip 2. Then, the reading portion 301 reads and outputs it to the verifying portion 302 (S1502).

In response to this, the verifying portion 302 performs an error check on the ID code by using CRC or the like included in the ID code received from the reading portion 301. After determining that no error exists, the ID code is verified by using MAC included in the ID code and a verifying key (for example a public key pairing with a private key of the manufacturer of the electronic circuit chip 2, for example), which is registered in advance. If the verification is satisfied, the ID code is handed to the radio communicating portion 303 (S1503). If the verification is not satisfied, there is a possibility that the ID code might be forged. Thus, the fact is notified to the user through the user IF portion 304.

The radio communicating portion 303 receives the ID code from the verifying portion 302 and then sends the ID code to the user terminal 4 along with a reader ID, which is registered in advance (S1504).

Next, in the user terminal 4, the handling support portion 402 receives the ID code and the reader ID from the ID reader 3 through the radio communicating portion 401 and then holds and sends the ID code to the ID management server 5 through the network IF portion 403 (S1505).

Next, in the ID management server 5, the address searching portion 503 receives the ID code from the user terminal 4 through the network IF portion 501 and then searches an address of the attribute information management server 6, which is registered in the address DB 502 corresponding to the manufacturer code included in the ID code (S1506). Then, the detected address of the attribute information management server 6 is sent, through the network IF portion 501, to the user terminal 4 to which the ID code is sent (S1507).

Next, in the user terminal 4, the handling support portion 402 receives the address from the ID management server 5 through the network IF portion 403 and then sends the ID code along with a user ID, which is registered in advance, to the attribute information management server 6, which is specified from the address, through the network IF portion 403 (S1508).

Next, in the attribute information management server 6, the attribute information searching portion 603 receives the ID code and the user ID from the user terminal 4 through the network IF portion 601. Then, the attribute information searching portion 603 searches attribute information, which is registered in the attribute information DB 602 in correspondence with a category code included in the ID code (S1509). Then, the detected attribute information is sent along with the user ID received from the user terminal 4 to the intake management support server 7 through the network IF portion 501 (S1510).

Next, in the intake management support server 7, the support message creating portion 705 receives the attribute information and the user ID from the attribute information management server 6 through the network IF portion 701. Then, the support message creating portion 705 extracts user information from the user information DB 703 and extracts an intake action history table 7021 from the intake action history DB 702 by using the user ID as the key. In addition, the attribute information is used as a key to extract the handling rule from the handling rule DB 704. Then, a message is created for an intake action based on the intake action history recorded in the intake action history table 7021, user information and the handling rule (S1511).

More specifically, in the intake action history, it is checked whether or not the attribute information of an object taken immediately therefore (for example, within several minutes) is described in the handling rule as a combination of objects, whose intake must be avoided. In addition, it is checked whether or not the user's constitution or sickness history described in the user information is described in the handling rule as the constitution and/or history, requiring the intake to be avoided. Then, a message is created for the intake action on which the check results are reflected. For example, When the attribute information of the object taken immediately therebefore is applicable to the combination of the objects whose intake must be avoided, a message is created to indicate that the object to be taken makes a bad combination with the object taken immediately therebefore. Furthermore, when the user's constitution and/or history described in the user information are applicable to the constitution and/or history, which require the intake to be avoided, a message is created to indicate that the object to be taken does not fit to the user's constitution or history. When the attribute information of the object having been taken immediately therebefore is not applicable to the combination of objects requiring the intake to be avoided, and when the user's constitution and/or history are not applicable to the constitution and/or history requiring the intake to be avoided, a message indicating these facts is created.

Now, when the support message creating portion 705 creates a message as described above, the message is sent to the address of the user terminal 4, which is specified from the user information, through the network IF portion 701 (S1512).

Next, In the user terminal 4, the handling support portion 402 receives the message from the intake management support server 7 through the network IF portion 403. Then, the handling support portion 402 sends it to the ID reader 3, which is specified by the reader ID having held in advance at the S1505, through the radio communicating portion 401 (S1513).

Next, in the ID reader 3, the user IF portion 304 receives the message from the user terminal 4 through the radio communicating portion 303. Then, the user IF portion 304 outputs the message to a display device and/or a voice device. In addition, the user IF portion 304 receives a confirmation from the user regarding whether the intake action is performed or not (S1514). Then, when the confirmation is received, it is sent to the user terminal 4 through the radio communicating portion 303 (S1515).

Next, in the user terminal 4, the handling support portion 402 receives the confirmation regarding whether the intake action is performed or not through the radio communicating portion 401. Then, the handling support portion 402 sends it along with the user ID having held in advance to the intake management support server 7 through the network IF portion 403 (S1516).

Now, in the intake management support server 7, the support message creating portion 705 receives the user ID and the check regarding the intake action is performed or not from the user terminal 4 through the network IF portion 701. If the confirmation indicates that the intake action will be performed, the intake action history table 7021 having the user ID within the intake action history DB 702 is specified. Then, a new record is added to the table, and the present date and time are registered as action date and time 70211. In addition, the attribute information received along with the user ID from the attribute information management server 6 at the S1511 is registered as the attribute information 70212 (S1517).

In this embodiment, the electronic circuit chip 2 is attached to the object 1, the container or the attachment thereof. The object 1 can be identified by reading the ID code from the electronic circuit chip 2. Then, a message relating to handling in accordance with the attribute information of the identified object 1 is communicated to the user.

More specifically, the message for the action for taking the object 1 is created by using the attribute information of the object 1, the user intake action history and user information and it is communicated to the user. Thus, a solution system (intake management system) can be provided which allows managing intake actions for each user in consideration of the situation of each user.

In this embodiment, the user information and/or the intake action history of each user are only managed in the intake management supporting server 7 and are not sent to the network 8 in the processing flow shown in FIG. 15. Therefore, even when an open network such as the Internet is used at the network 8, the possibility of an infringement of user's privacy can be reduced.

In this embodiment, the ID codes are managed by the ID management server 5, the attribute information of objects are managed by the attribute information management server 6 provided for each of the manufacturers of the objects, for example. The user information and/or intake action history are managed by the intake management support server 7. In this way, by establishing the solution system by using the multiple servers 5 to 7, the concentration of loads can be dispersed. Therefore, the efficient solution system can be established.

Furthermore, an ID code is stored in the unrewritable area of the electronic circuit chip 2. Thus, unauthorized third party cannot alter the ID code. By definition, manufacturing the electronic circuit chip 2 itself requires sufficient facilities. The smaller and the thinner the electronic circuit chip 2 is, the more the number of manufactures of the electronic circuit chip 2 is limited. Also the ID code includes the MAC 213 for alteration verification, which is created by using a private key of the manufacture of the electronic circuit chip 2. Thus, even if the ID code is altered in a radio section between the electronic circuit chip 2 and the ID reader 3, for example, the fact indicating thereof can be detected. By using the electronic circuit chip 2 having the feature, it is easier to detect the forgery of objects or the like.

While, in this embodiment, the MAC verifying key is placed in the ID reader 3, the verifying key may be also placed in the ID management server 5. Thus, the ID code may be verified there.

In this embodiment, a function for detecting a surrounding environmental information (temperature, humidity, noise and air pollution condition) may be provided to the ID reader 3. Then, by sending the ID reader 3 to the intake management support server 7, the intake management support server 7 can perform an operation (message creation) in accordance with the environment.

This embodiment assumes a case where a stationary type computer system is used as a user terminal 4. Thus, the user terminal 4 is a separate apparatus from the ID reader 3 that must be portable. Thus, the ID reader 3 and the user terminal are connected through radio communication (for example, radio LAN). However, the present invention is not limited thereto. A mobile terminal such as PDA self-containing the ID reader 3 and having a communication function with the network 8 may be used as the user terminal 4.

In this embodiment, as shown in the flow in FIG. 15, when the ID reader 3 reads the ID code from the electronic circuit chip 2 (when the electronic circuit chip 2 is within the receivable area (for example, on the palm)), a message for an intake action is always created and is given to the user to ask the user whether the intake action will be performed or not. However, when the ID reader 3 reads the ID code from the electronic circuit chip 2, that is, even when the user holds the object 1, the action may not link to the intake action clearly.

For example, when a user runs a drug store, all action of holding a medicine (the object 1) in the store may be that for handling the medicine to a customer in most cases. Alternatively, when an intake action before the noon is strictly inhibited, for example, an action holding the object 1 before the noon may be considered as being nothing to do with the intake action in most cases.

Thus, when the ID reader 3 reads the ID code from the electronic circuit chip 2 (the S1504 in FIG. 15), and if the read fact is regarded as not related to the intake action, the user terminal 4 may not perform the processing thereafter (processing after the S1505 in FIG. 15). Then, the processing may end. Alternatively, the user is asked through the ID reader 3 whether an intake action will be performed or not. Only if it is confirmed that the intake action will be performed, processing thereafter (processing after the S1505 in FIG. 15) may be performed.

For example, a position detecting function may be provided to the ID reader 3. This may be implemented by using a GPS or the like. Alternatively, a positional information transmitter may be provided for each location (for example, for each room in the user's home) such that the ID reader 3 can receives the positional information. Then, the position can be detected. At the S1504 in FIG. 15, the ID reader 3 is caused to send to the user terminal 4 the positional information detected by the position detecting function along with the ID code and the reader ID.

On the other hand, a location table in which an estimated action of the user is registered is provided in the user terminal 4 for each location (for example, for each room in the user's home). Here, information indicating whether the possibility that the user will perform an intake action is high or not as an estimated action of the user is registered for each location. Then, at the S1505 in FIG. 15, when the estimated action mapped to the location including positional information received from the ID reader 3 indicates the intake action with a higher possibility, the ID code is immediately notified to the ID management server 5. On the other hand, when there is a low possibility to perform the intake action, the user is asked through the ID reader 3 whether the intake action will be performed or not. Only if it is confirmed that the intake action is performed, the ID code is notified to the ID management server 5.

Furthermore, for example, a context table in which an estimated action of the user is registered for each time period may be provided to the user terminal 4. Here, the information indicating whether the possibility that the user will perform an intake action is high or not as the estimated action of the user is registered for each time period. Then, at the S1505 in FIG. 15, when the estimated action mapped to the time period including a time of receiving the ID cord from the ID reader 3 indicates the intake action to be performed with a high possibility, the ID code is immediately notified to the ID management server 5. On the other hand, when there is a low possibility of the intake action to be performed, the user is asked through the ID reader 3 whether the intake action will be performed or not. Only if it is confirmed that the intake action is perforated, the ID code is notified to the ID management server 5.

In this way, the loads on the servers 5 to 7 can be reduced.

Next, a second embodiment of the present invention will be described by using, as an example, a case where the present invention is applied to a solution system (called import/export management system) for managing the import/export action for each object in the business field such as trading.

An object in this embodiment is a distributed item to be imported/exported. In this embodiment, the import/export action is monitored for each object. When a special care is required for the action, a message indicating thereof is given to a user (import/export manager).

Figure 16:
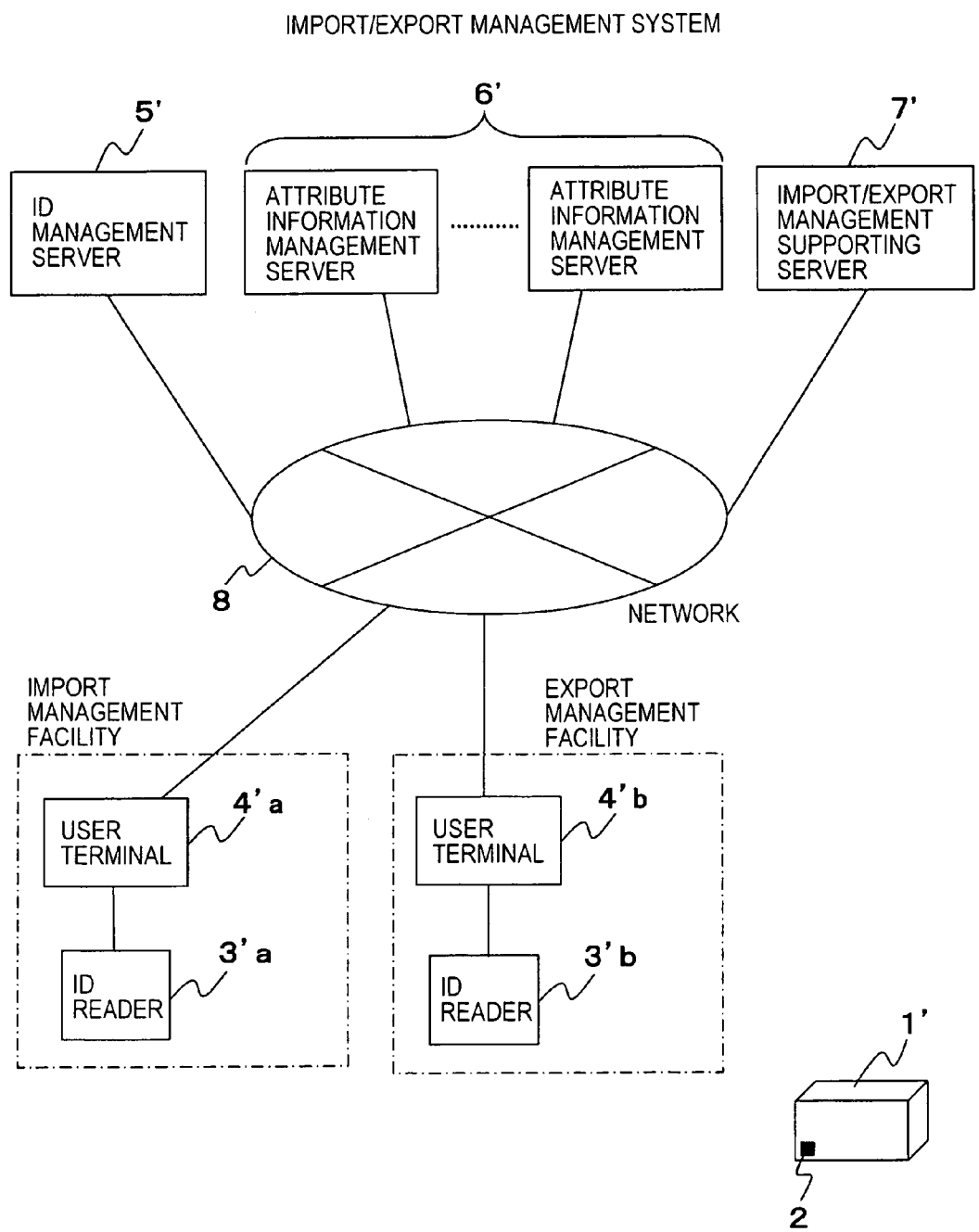
FIG. 16 is a schematic diagram of an import/export management system to which a second embodiment of the present invention is applied.

FIG. 16 is a schematic diagram of an import/export management system to which the second embodiment of the present invention is applied. Here, the same reference numerals are given to ones having the same functions as those described in the first embodiment.

As shown, an RFID electronic circuit chip 2 storing an ID which is unique identification information given to a distributed item 1' is attached to the distributed item 1' and/or the attachment.

ID readers 3'a and 3'b are RFID reading devices located in a facility such as customs through which items must be passed for importing/exporting. Here, the ID reader 3'a is provided in an import management facility through which items always pass to be imported. The ID reader 3'b is provided in an export management facility through which items always pass to be exported. In this embodiment, the ID readers 3'a and 3'b are connected to user terminals 4'a and 4'b respectively. Therefore, in the schematic construction of the ID readers 3'a and 3'b, the radio communicating portion 303 is replaced by a connection portion with the user terminals 4'a and 4'b. In addition, the user IF portion 304 can be omitted by using those of the user terminals 4'a and 4'b.

The user terminals 4'a and 4'b receive an ID code and a reader ID from the ID readers 3'a and 3'b, which are connected to the user terminals 4'a and 4'b. Then, the user terminals 4'a and 4'b exchange information with servers 5' to 7'. Thus, when a distributed item 1' to which the ID code is given is to be imported or exported, a message relating to the import/export action is obtained and is sent out. In this embodiment, The ID readers 5'a and 3'b are locally connected to the user terminals 4'a and 4'b, respectively. Therefore, in the schematic configuration of the user terminals 4'a and 4'b, the radio communicating portion 403 is replaced by a connection portion with the ID readers 3'a and 3'b in FIG. 5. Each of the user terminals 4'a and 4'b requires a user IF portion for communicating a message to a user or for receiving an instruction from the user.

FIG. 16 shows one import management facility and one export management facility each. However, in practice, these facilities are provided for each country. The user terminals 4'a and 4'b provided for the import management facility and the export management facility for each country are connected to the servers 5' to 7' through a network 8.

The attribute information management server 6' is provided for each manufacturer of a distributed item, for example. Then, attribute information of each distributed item manufactured by a corresponding manufacturer is managed by using the ID code. Here, attribute information of a distributed item may be a selling area (country) and/or instructions for handling the distributed item, for example. The schematic configuration of the attribute information management server 6' is the same as that of the attribute information management server 6 according to the first embodiment shown in FIG. 6.

The ID management server 5' manages an address (destination address) of the attribute information management server 6'. The schematic configuration of the ID management server 5' is the same as that of the ID management server 5 according to the first embodiment shown in FIG. 8.

An import/export management support server 7' manages a history of the distribution action for each distributed item. When a distributed item is to be newly imported/exported, a message for the action is notified to the user terminals 4'a and 4'b.

Figures 17, 18:
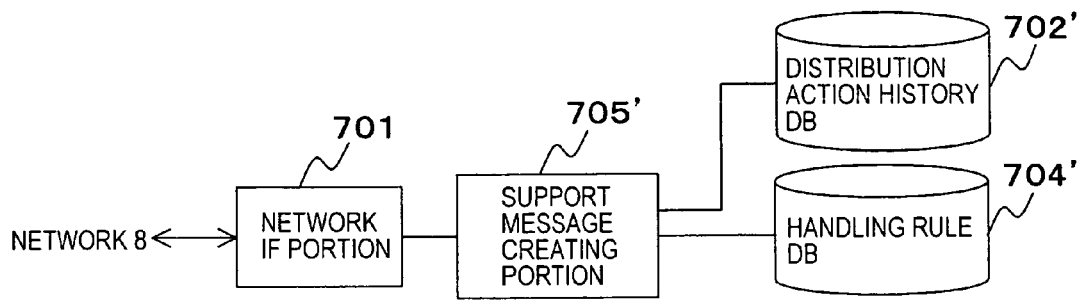
FIG. 17 is a schematic configuration diagram of an import/export management supporting server 7' shown in FIG. 16.
FIG. 18 is a diagram showing a registered content example of a distribution action history DB702' shown in FIG. 17.

FIG. 17 is a schematic configuration diagram of the import/export management support server 7. Here, the same reference numerals are given to ones having the same functions as those described in the first embodiment.

As shown in FIG. 18, a distribution action history table 7021' is provided in a distribution action history DB 702' for each ID code. Records including a date and time 70211' of an import/export action, an action type 70212' indicating an import action or an export action and an imported/exported country 70213' is registered in the distribution action history table 7021' in chronological order.

Like the handling rule DB 704 in the first embodiment shown in FIG. 13, a handling rule 7042 is registered in a handling rule DB 704' for each attribute information 7041 of a distributed item. However, in this embodiment, the content of the handling rule may be information relating to notices for an import/export action such as whether it is fragile or not, or whether specific countries are designated by law where the import/export are allowed, and so on.

The support message creating portion 705' receives an ID code and attribute information from the attribute information management server 6'. Then, the support message creating portion 705' extracts information from the import/export action history DB 702' and the handling rule DB 704' by using the ID code and the attribute information as a key. Then, the support message creating portion 705' creates a message for the export/import action based on the extracted information.

Next, an operation of the import/export management system will be described.

Figure 19:
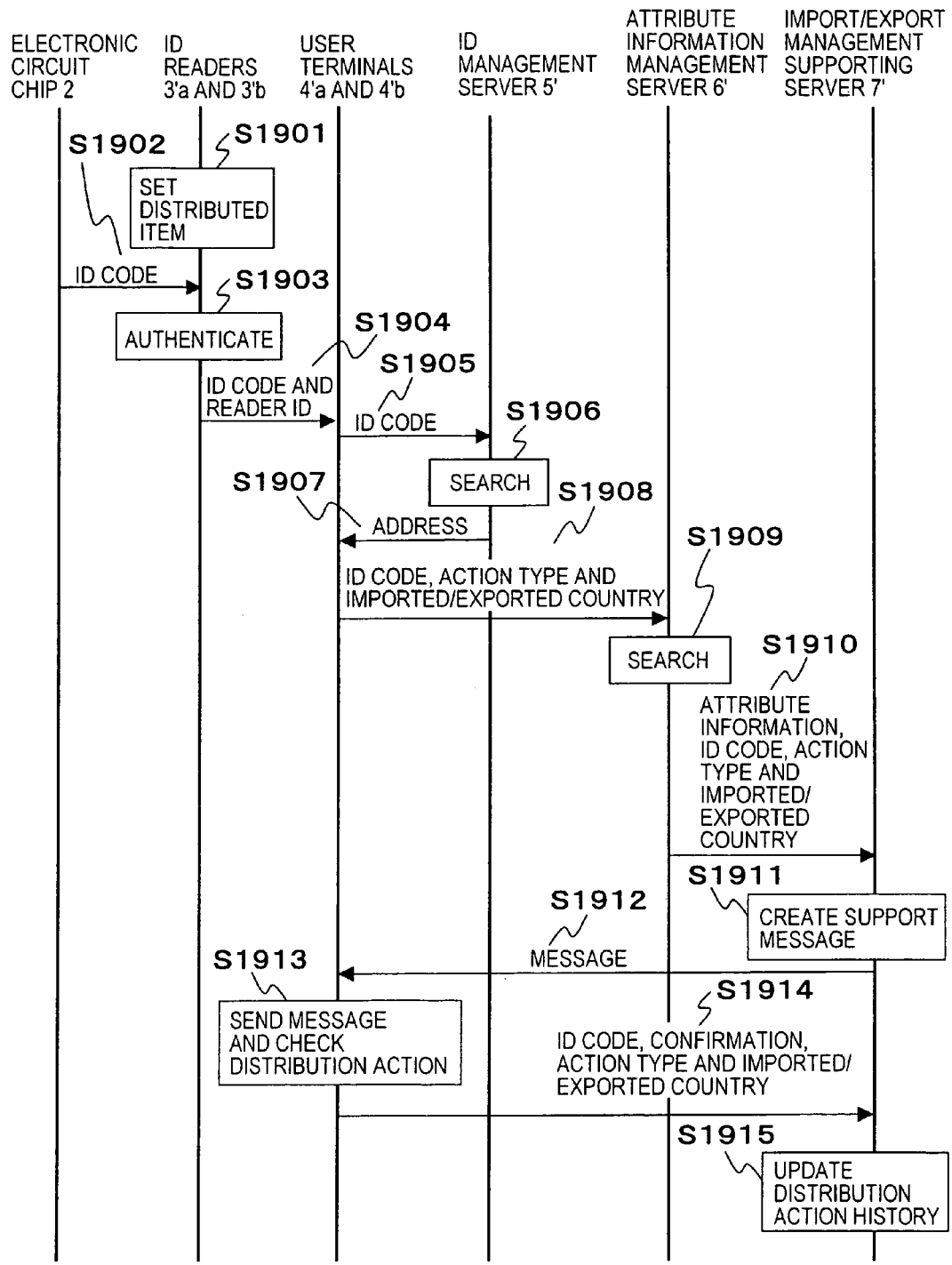
FIG. 19 is a diagram for explaining an operation of the import/export management system shown in FIG. 16.

FIG. 19 is a diagram for explaining an operation of the import/export management system shown in FIG. 16.

First of all, a distributed item 1' is brought to one of the export management facility and the export management facility. When the distributed item 1' is set within the receivable area of the ID readers 3'a and 3'b (simply called ID reader 3' hereinafter) located in the facility (S1901), the ID reader 3' reads the ID code from the electronic circuit chip 2 attached to the distributed item 1' by using the reading portion 301 (S1902). Then, the ID code is verified by a verifying portion 302 (S1903). If the verification is not satisfied, there is a possibility of forgery. Thus, the fact indicating thereof is notified to the user terminals 4'a and 4'b (simply called user terminal 4' hereinafter), which are locally connected to the ID reader 3' to notify it to the user (import/export manager). On the other hand, if the verification is satisfied, the ID code is notified to the user terminal 4' along with the reader ID, which has been registered in advance (S1904).

Next, in the user terminal 41, the handling support portion 402 receives the ID code and the reader ID from the ID reader 3'. Then, the handling support portion 402 holds and sends the received ID code and reader ID to the ID management server 5' through the network IF portion 403 (S1905).

Next, in the ID management server 5', the address searching portion 503 receives the ID code from the user terminal 4' through the network IF portion 501. Then, the address searching portion 503 searches an address of the attribute information management server 6', which is registered in the address DB 502 in correspondence with the manufacturer code included in the ID code (S1906). Then, the detected address of the attribute information management server 6' is sent to the user terminal 4' having been sent the ID code through the network IF portion 501 (S1907).

Next, in the user terminal 4', the handling support portion 402 receives the address from the ID management server 4' through the network IF portion 403. Then, the handling support portion 402 sends the ID code along with the action type (import action or export action) and information of the imported/exported country, which have been registered in advance, to the attribute information management server 6' specified by the address through the network IF portion 403 (S1908).

Next, in the attribute information management server 6', the attribute information searching portion 603 receives the ID codes the action type and the imported/exported country information from the user terminal 4' through the network IF portion 601. Then, the attribute information searching portion 603 searches attribute information, which is registered in the attribute information DB 602 in correspondence with the category code included in the ID code (S1909). Then, the detected attribute information is sent along with the ID code, the action type and the imported/exported country information received from the user terminal 4' to the import/export management support server 7' through the network IF portion 501 (S1910).

Next, in the import/export management support server 7', the support message creating portion 705' receives the attribute information, the ID code, the action type and the imported/exported country information from the attribute information management server 6' through the network IF portion 701. Then, the support message creating portion 705' extracts the distribution action history table 7021' from the distribution action history DB 702' by using the ID code as a key. In addition, the support message creating portion 705' extracts a handling rule from the handling rule DB 704' by using the attribute information as a key. Then, based on the import/export action history and the handling rule recorded in the distribution action history table 7021', a message is created for an import/export action specified by the action type and the imported/exported country information (S1911).

More specifically, the import/export action specified by the action type and the imported/exported country information may be an import action or maybe an export action from a country other than a country X even though the import/export action which took place just before and is recorded in the distribution action history table 7021', is an import action to the country X. In this case, an import/export action has been possibly performed not through an official route during a period between the import action to the country X and this import/export action. Similarly, the import/export action specified by the action type and the imported/exported country information may be an export action or may be an import action to the country X even though the import/export action which took place just before and is recorded in the distribution action history table 7021', is the export action from the country X. In this case, an import/export action has been possibly performed not through an official route during a period between the export action from the country X and this import/export action.

Thus, in this case, a message is created for indicating that there is a possibility that the import/export action not through the official route may have been performed.

When the handling rule provides to prohibit import actions from the country X to a country Y, and when the import/export action which took place just before and is recorded in the distribution action history table 7021', is an export action from the country X and the import/export action specified by the action type and the imported/exported country information is an import action to the country Y, it is highly possible to be applicable to the prohibited provision. Furthermore, when the handling rule provides to prohibit export actions from the country Y to the country X, and when the import/export action which took place just before and is recorded in the distribution action history table 7021', is an export action from the country Y and the import/export action specified by the action type and the imported/exported country information is an import action to the country X, it is highly possible to be applicable to the prohibited provision.

Thus, in these cases, a message is created for indicating that there is a possibility that this import/export action may be applicable to the prohibited provision.

After the support message creating portion 705' creates the message in this manner, the message is sent to the user terminal 4' located in a facility in a country specified by the import/export country information, which is an import management facility or an export management facility for managing the import/export action specified by the action type information through the network IF portion 701 (S1912).

Next, in the user terminal 4', the handling support portion 402 receives the message from the import/export management supporting server 7' through the network IF portion 403. Then, the handling support portion 402 notifies the message to the user and receives the confirmation regarding whether the import/export action is performed or not from the user (S1913). If the confirmation is received, it is sent along with the ID code, the action type and the imported/exported country information to the import/export management supporting server 7' through the network IF portion 403 (S1914).

In the import/export management supporting server 7', the support message creating portion 705'(receives the confirmation regarding whether the import/export action specified by the action type is performed or not, along with the ID code, the action type and the imported/exported country information from the user terminal 4' through the network IF portion 701. If the information indicates that the import/export action is to be performed, the distribution action history table 7021' having the ID code within the distribution action history DB 702' is specified. Then, a new record is added to the table and current date and time are registered as the action date and time 70211'. In addition, the action type and the imported/exported country information received from the user terminal 4' are registered as the action type. 70212' and the imported/exported country (S1915).

The second embodiment of the present invention has been described above.

In this embodiment, the electronic circuit chip 2 is attached to the distributed item 1' and/or the attachment. An ID code is read from the electronic circuit chip 2 so as to identify the distributed item 1'. Then, a message relating to the handling in accordance with attribute information of the identified distributed item 1' is given to the user. More specifically, by using the attribute information of the distributed item 1' and the import/export history of the distributed item 1', a message for an import/export action of the distributed item 1' is created and is given to the user. Thus, the solution system (import/export management system) can be achived for managing the import/export action for each distributed item. The other effects are the same as those of the first embodiment.

Also in this embodiment, like the first embodiment, the user terminal 4' and the ID reader 3' may be integrated to a single device. Alternatively, the device may be a stationary computer system or may be a mobile computer system such as a PDA.

This embodiment can be also applied to a solution system such as an immigration management system. For example, when applied to the immigration management system, the electronic circuit chip 2 is attached to a passport as the distributed item 1'. By managing an immigration history of the passport as the distribution history of the distributed item 1', a message is created for an immigration action of the passport owner and is given to an immigration manager.

Next, a third embodiment of the present invention will be described by using, as an example, a case where the present invention Is applied to an object location management system.

An object in this embodiment is an item requiring its location to be managed. In this embodiment, an item accommodated in the containing box are managed for each containing box and its attribute information and the like of the item are given to a user.

Figure 20:
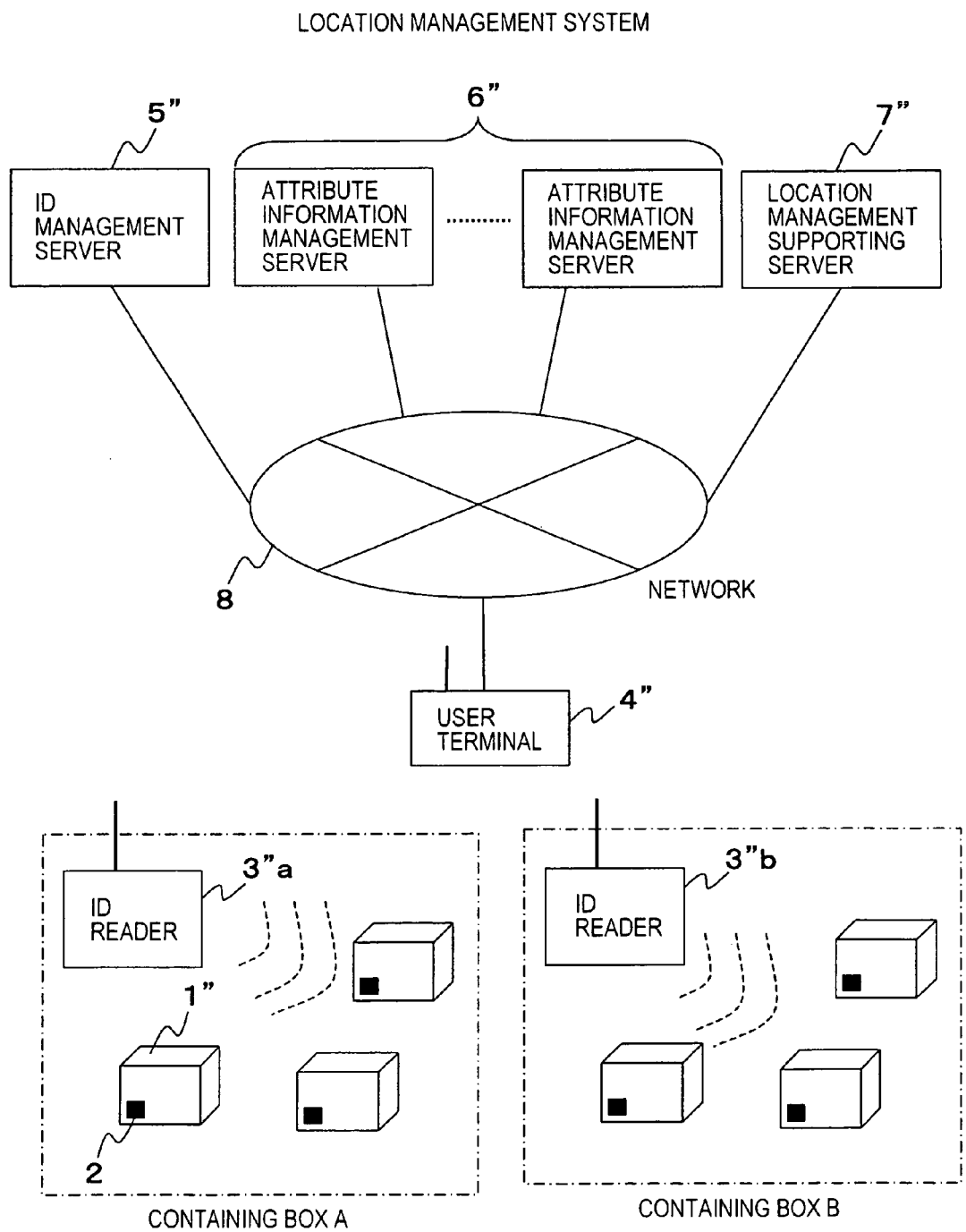
FIG. 20 is a schematic diagram of a location management system to which a third embodiment of the present invention is applied.

FIG. 20 is a schematic diagram of a location management system to which the third embodiment of the present invention is applied. Here, the same reference numerals are given to ones having the same functions as those described in the first embodiment.

As shown, an RFID electronic circuit chip 2 storing an ID code of an item 1" is attached to the item 1".

ID readers 3"a and 3"b (also called ID reader 3", hereinafter) are RFID reading devices located in a containing box of the item 1". The schematic configuration is the same as that of the first embodiment shown in FIG. 4. However, in this embodiment, since a user terminal 4" performs a message notification to a user or an instruction reception from the user, the user IF portion 304 is not necessary.

The user terminal 4" exchanges information with servers 5" to 7" to obtain a message relating to a location of the item 1" and/or to update the location of the item 1". The schematic configuration of the user terminal 4" is the same as that of the first embodiment shown in FIG. 5. However, in this embodiment, since the user terminal 4" performs a message notification to a user and an instruction reception from the user, a user IF portion is required in the user terminal 4".

An attribute information management server 6" is provided for each manufacturer of an item, for example. Then, attribute information of each item manufactured by a corresponding manufacturer is managed by using an ID code. Here, the attribute information of the item may be the name, application, or handling instruction of the item or image information indicating an appearance of the item, for example. The schematic configuration of the attribute information management server 6" is the same as the attribute information management server 6 of the first embodiment shown in FIG. 6.

An ID management server 5" manages an address (destination address) of the attribute information management server 6". The schematic configuration of the ID management server 5" is the same as the ID management server 5 of the first embodiment shown in FIG. 8.

A location management supporting server 7" manages a location history for each item, In addition, the location management supporting server 7" notifies a message relating to an item location to the user terminal 4".

Figure 21:
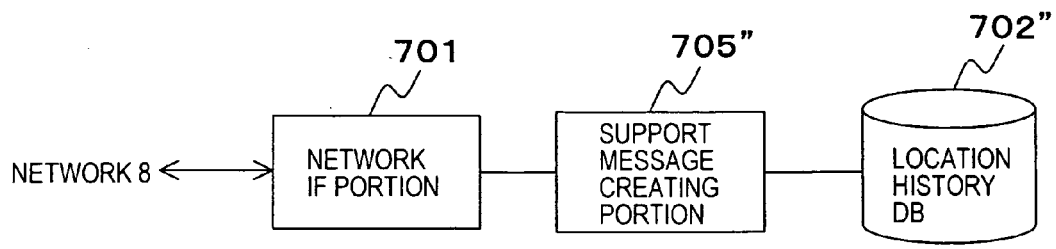
FIG. 21 is a schematic configuration diagram of a location management supporting server 7" shown in FIG. 20.

FIG. 21 is a schematic configuration diagram of the location management supporting server 7". Here, the same reference numerals are given to ones having the same functions as those described in the first embodiment.

Figure 22:
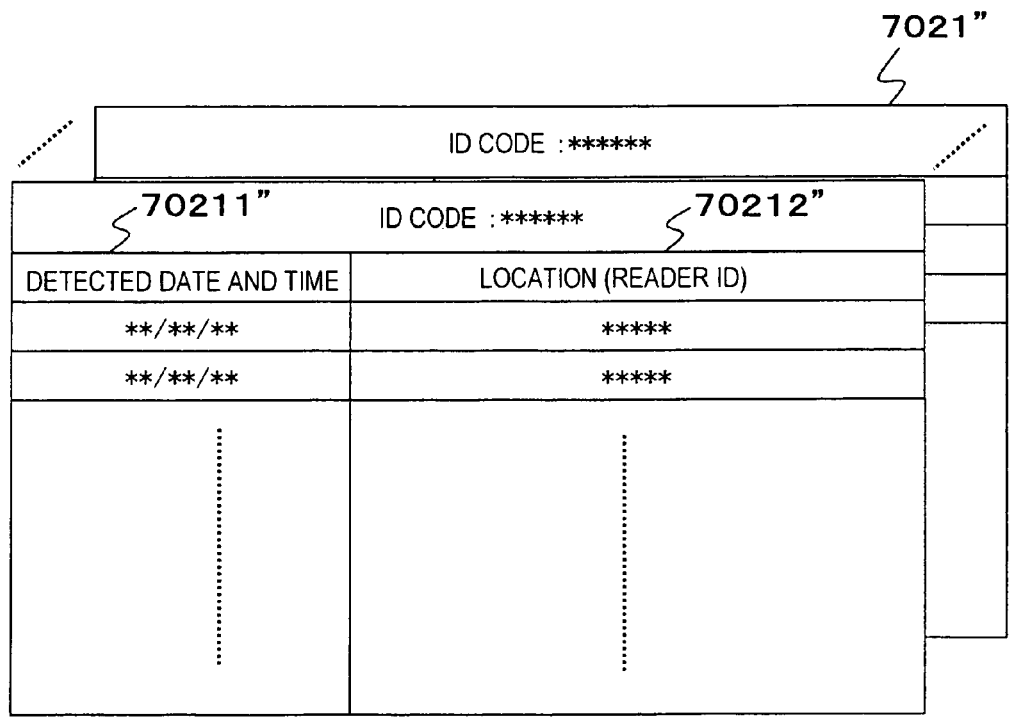
FIG. 22 is a diagram showing a registered content example of a location history DB702" shown in FIG. 21.

A location history table 7021" is provided in the location history DB 702" for each ID code, as shown in FIG. 22. A record including detected (moved) date and time 70211" and a location (reader ID, in this case) 70212" indicating which containing box the item is accommodated in is registered in each of the location history tables 7021" in chronological order.

The support message creating portion 705" receives a location updating request including an ID code and a reader ID from the user terminal 4". Then, the support message creating portion 705" specifies the location history table 7021" having the ID code and updates the location managed in the table. In addition, when a location tracking request including the ID code is received from the user terminal 4", the location history table 7021" having the ID code is specified. Then, a message is created for indicating a location history managed in the table and is given to the user terminal 4". When a contained item checking request including the reader ID is received from the user terminal 4", the location history table 7021" in which the reader ID is registered in the last record is specified. Then, a message is created for indicating attribute information of the item to which the ID code of the respective specified location history table 7021" is given and is given to the user terminal 4".

Next, an operation of the location management system will be described.

Figure 23:
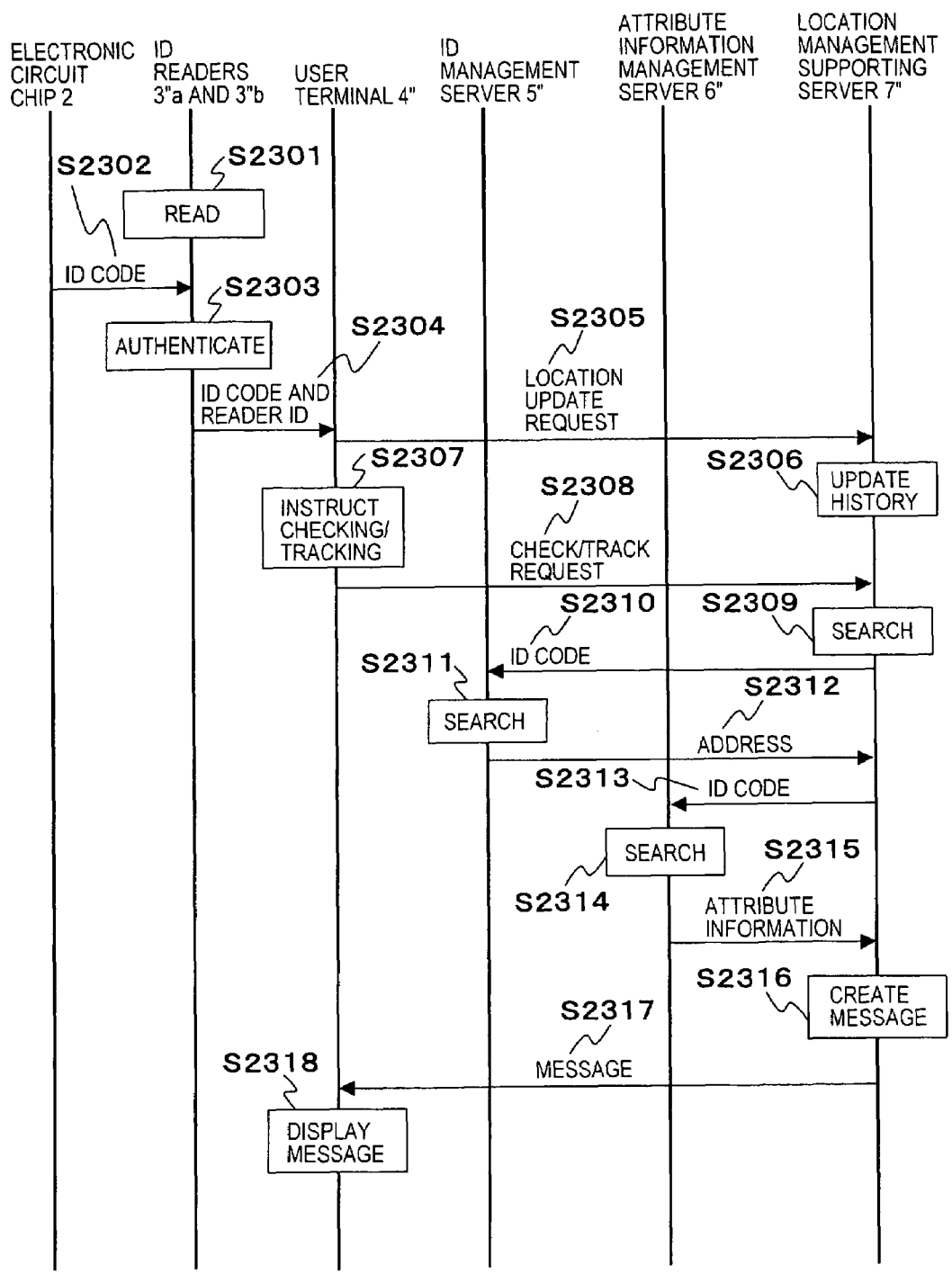
FIG. 23 is a diagram for explaining an operation of a location management system shown in FIG. 20.

FIG. 23 is a diagram for explaining an operation of the location management system shown in FIG. 20.

First of all, the ID reader 3" located in each containing box sends radio waves for reading an ID code from a reading portion 301 and tries to read the ID code (S2301) periodically or when a predetermined event such as a receipt of an instruction from a user occurs. Thus, the electronic circuit chip 2 attached to the item 1" contained in the containing box is driven. Then, the ID code is read from an electronic circuit 202 of the electronic circuit chip 2. The ID reader 3" reads it from the reading portion 301 (S2302). Then, the verifying portion 302 verifies the ID code (S2303). When the verification is satisfied, the ID code and the reader ID having registered in advance are notified to the user terminal 4" (S2304).

Next, in the user terminal 4", the handling support portion 402 receives the ID code and the reader ID from the ID reader 3" and sends a location updating request including them to the location management supporting server 7" through the network IF portion 403 (S2305).

Next, in the location management supporting server 7", the location message creating portion 705" receives the location updating request from the user terminal 4" through the network IF portion 701. Then, the support message creating portion 705" specifies the location history table 7021" having the ID code included in the request from the location history DB702". Then, a record is added to the table and the current date and time are registered therein as the detected date and time 70211". In addition, the reader ID, included in the request is registered therein as the location 70212" (S2306).

Now, the user terminal 4" receives an instruction for a location tracking request including the specification of the ID code or for a content checking request including the specification of the reader ID (S2307). Then, the user terminal 4" sends it to the location management supporting server 7" through the network IF portion 403 (S2308).

In the location management supporting server 7", the support message creating portion 705" specifies, from the location history DB 702", the location history table 7021" having the ID code included in the request and notifies the ID code to the ID management server 5" if the request received from the user terminal 4" through the network IF portion 701 is the location tracking request. On the other hand, if the request received from the user terminal 4" is the content checking request, the location history table 7021" in which the reader ID included in the request is registered in the last record is extracted from the location history DB 7021, and the ID code of each of the extracted table is notified to the ID management server 5" (S2309 and S2310).

The ID management server 5" receives the ID code from the location management supporting server 7" and then searches the address of the attribute information management server 6", which is registered in the address DB 502 in correspondence with the manufacturer code included in the ID code (S2311). Then, the address of the detected attribute information management server 6" is sent to the location management supporting server 7" through the network IF portion 501 (S2312).

Next, in the location management supporting server 7", the support message creating portion 705" receives the address from the ID management server 4" through the network IF portion 701 and then sends the ID code notified to the ID management server 4" at the S2310 to the attribute information management server 6" specified by the address (S2313).

Next, in the attribute information management server 6", the attribute information searching portion 603 receives the ID code from the location management supporting server 7" through the network IF portion 601 and then searches attribute information, which is registered in the attribute information DB 602 in correspondence with the category code included in the ID code (S2314). Then, the detected attribute information is sent along with the ID code to the location management supporting server 7" (S2315).

Next, in the location management supporting server 7", the support message creating portion 705" receives the attribute information along with the ID code from the attribute information management server 6" through the network IF portion 701 and then creates a message in accordance with the request received from the user terminal 4" in the S2308 (S2315).

If the request received from the user terminal 4" is the content checking request, a message including attribute information received from the attribute information management server 6" is created. On the other hand, if the request received from the user terminal 4" is the location tracking request, a message including information of respective records registered in the location history table 7021" specified at the S2309 and attribute information is created.

The message created in this manner is sent to the user terminal 4" through the network IF portion 701 (S2316).

Now, the user terminal 4" receives the message from the location management supporting server 7" and then presents the message to the user by using a display device and so on (S2317). Here, it is assumed that the user terminal 4" holds a location (arrangement) of the containing box in correspondence with the reader ID in advance. Thus, when the message for the location tracking request is received from the location management supporting server 7", the location of the containing box corresponding to the reader ID written in the message may be arranged to be displayed.

In this embodiment, the electronic circuit chip 2 is attached to the item 1". Then, the ID code stored in the electronic circuit chip 2 is read by the ID reader 3" provided in the containing box containing the item 1". Thus, the item 1" contained in each of the containing boxes may be identified. Then, a message including attribute information of each of each item 1" contained in a containing box specified by the user may be created and be given to the user, Alternatively, a message including a transfer history (transition of the containing box) of the item 1" specified by the user may be created and be given to the user. As a result, the solution system (location management system) for managing an item for each containing box can be achieved. The other effects are the same as those of the first embodiment.

In this embodiment, if the item 1" is a document and the containing box is a document tray, for example, a location of the document which is close to processing limit can be detected. In addition, if the item 1" is a toy and the containing box is a toy box, for example, it can be checked whether a kid puts a toy back to a predetermined toy box or not. In this case, if the containing box itself is set as the item 1", it can be checked through the display device whether the containing box itself is put back to the original position properly. If the item 1" is an item, which is easier to be lost, such as a stationery, a seal, a key, a purse and a remote controller and so on and the ID reader 3" is provided in each room instead of the containing box, the location of the lost item can be searched.

The present invention is not limited to the above-described embodiments, and the various changes are possible within the scope of the principle.

For example, in the above-described embodiments, the ID management center does not have to be one. Multiple ID management servers for managing different attribute information management servers may be provided. Then, the user terminal may inquire the multiple ID management servers sequentially to obtain an address of the attribute information management server. Each kind of the supporting servers does not have to be one, but multiple servers may be provided. Each attribute information management server may be set to distribute supporting servers, to which attribute information is notified. Thus, the load can be distributed. Furthermore, the solution systems described in the above-described embodiments may be provided on the same network 8.

In the above-described embodiments, the electronic circuit chip 2 does not have to be used for giving an ID code to an item. The other various methods may be applied. For examples, in the first and second embodiments, an ID code maybe printed on an item by using a barcode, for example, and may be read by an ID reader that functions as a barcode reader.

In addition, the solution systems described in the embodiment are for the illustrative purpose only. The present invention can be applied to various system each including identification information uniquely given to a distinguishable individual object (including not only goods but also living creature etc.), a reading device for reading identification information, user terminal connected to the reading device, an information network connected to the user terminal, an information processing device connected to the information network, and a database device, which is connected to the information processing device or which can read out or write in the information processing device. Here, the identification information may use an RFID tag including a prewritten, unique read-only number.

In this system, when a specific event expected for an object occurs, first of all, the reading device reads the identification information given to the object in response to an instruction from the user or by automatic detection. Next, the user terminal collects the identification information read by the reading device and information relating to the object caused as a result of the event and transmits the information to the information processing device over the information network. Then, the information processing device receives the information relating to the object and then registers it in the data base device in a form where it is arranged by associating with the identification information as a unique attribute of the object. These steps are repeated every time when a specific event expected for the object occurs. Thus, information relating to the object is accumulated.

Here, information relating to the object means some of following events relating to the object or information caused as a result of an event relating thereto:

(1) Manufacturing, processing or altering an object (a product formed of many parts, such as an automobile);
(2) Connecting, assembling or disassembling with another object;
(3) Giving or adding information to the object itself (such as checking a content of a toy box or jewel box);
(4) Moving a place of an object (transportation)
(5) Checking the presence of the object (inventory control or the like);
(6) Business transaction by using a trusted object (such as passport, negotiable instrument and so on);
(7) Business transaction of selling, returning, trying an object and the like (management for over-the-counter sales other than import/ export);
(8) Owning, maintaining or transferring the protection of an object;
(9) Using or consuming an object (medicine or the like);
(10) Changes in a condition or a requirement of an object (such as whether a food within a refrigerator becomes old or not and whether a food to be placed in a freezing room is left in a refrigerator or not); and
(11) Discarding an object (such as reusing a part and preventing illegal dumping).

The information relating to an object includes the time, place, and condition of the occurrence of each event, the name and attribute of the other events relating to one event, the name of a person involved in an event, given information to the object and information regarding changes occurred to the object.

According to the present invention, in each of the above-described systems, when an event occurs or a need for using the system is raised for an object, information relating to the object, which has been stored by then in the user terminal and the information processing device, can be searched in any manner allowed by functions of a database device in accordance with a user request or a preprogrammed system function by using, as conditions, identification information read by a reading device from the object and, in addition to it, attribute items, a number range of each attribute and so on.

As described above, according to the present invention, an individual object can be identified, and a message relating to the handling in accordance with the attribute information can be given to a user, which therefore can be applied to various solution systems.

What is claimed is:

1. A handling support method for supporting handling of an object, comprising the steps of:
    connecting, to a user terminal over a network, a distribution system including at least one attribute information management server for managing attribute information of an object in correspondence with identification information given to the object, at least one identification information management server for managing the attribute information management server in correspondence with the identification information, and at least one supporting server for supporting handling of the object in accordance with the attribute information;
    based on identification information obtained by the user terminal, specifying, by the identification information management server, an address of the attribute information management server for managing attribute information of the object to which the identification information is given;
    specifying, by the attribute information management server, attribute information of the object to which the identification information is given; and
    creating and notifying to the user terminal, by the supporting server, support information relating to handling in accordance with the object attribute information specified by the attribute information management server.

2. A handling support method according to claim 1, in which the supporting server manages a history of handling the object for each user and manages a handling rule for each attribute information of the object, comprising:
    a first step of, in the user terminal, obtaining identification information given to the object and notifying the information to the identification information management server;
    a second step of, in the identification information management server, specifying the attribute information management server corresponding to the identification information notified by the user terminal and notifying the address to the user terminal;
    a third steps of, in the user terminal, notifying the object identification information obtained in the first step, along with the user identification information, to the attribute information management server having the address notified by the identification information management server;
    a fourth step of, in the attribute information management server, specifying object attribute information corresponding to the object identification information notified by the user terminal and notifying the information to the supporting server along with the user identification information notified by the user terminal; and
    a fifth step of, in the supporting server, creating a message regarding handling of the object by using the object handling history corresponding to the user identification information notified by the attribute information management server and the handling rule prepared in advance for the object attribute information notified by the attribute information management server and notifying the message to the user terminal.

3. A handling support method according to claim 2, in which the user terminal has a position identifying function for identifying a current position of an object whose identification information is obtained and a location table in which an estimated action of the user is registered for each location, comprising:
the third step of, in the user terminal, notifying to the attribute information management server having the address notified by the identification information management server in case that the estimated action registered in the location table in correspondence with a location to which the object current position identified by the position identifying function is a predetermined estimated action.

4. A handling support method according to claim 2, in which the user terminal has a time measuring function for measuring a current time and a context table in which an estimated action of the user is registered for each time period, comprising:
the third step of, in the user terminal, notifying to the attribute information management server having the address notified by the identification information management server in case that the estimated action registered in the context table in correspondence with a time period including the current time measured by the time measuring function is a predetermined estimated action.

5. A handling support method according to claim 2, wherein the object is an object taken to a body, and wherein the message is a message calling attention to an object intake action.

6. A handling support method according to claim 2, in which a Radio Frequency Identification (RFID) electronic circuit chip storing identification information given to an object is attached to a container of the object, an attachment of the object, or the object itself, comprising:
the first step of causing an RFID reading device having a function for communicating with the user terminal to read the identification information from the RFID electronic circuit chip existing in a receivable radio area and to send the information to the user terminal.

7. A handling support method according to claim 6, in which the RFID electronic circuit chip holds identification information along with authentication information of the identification information, comprising:
the first step causing the RFID reading device to read the identification information along with the authentication information from the RFID electronic circuit chip existing in the receivable radio area and to send them to the user terminal and causing the user terminal authenticate the identification information by using the authentication information and, if the authentication is satisfied, notifying the identification information to the identification information management server.

8. A handling support method according to claim 6, wherein the RFID electronic chip has an unrewritable memory area for storing information in the area.

9. A handling support method according to claim 1, in which the supporting server manages a history of moving each object and manages a handling rule for each attribute information of the object, comprising:
a first step of, in the user terminal, obtaining identification information given to the object and notifying the information to the identification information management server;

a second step of, in the identification information management server, specifying the attribute information management server corresponding to the identification information notified by the user terminal and notifying the address to the user terminal;
a third steps of, in the user terminal, notifying the object identification information obtained in the first step to the attribute information management server having the address notified by the identification information management server;
a fourth step of, in the attribute information management server, specifying object attribute information corresponding to the object identification information notified by the user terminal and notifying the information along with the user identification information to the supporting server; and
a fifth step of, in the supporting server, specifying a message regarding the object handling by using handling history of the object corresponding to the object identification information notified by the attribute information management server and the handling rule prepared in advance for the object attribute information notified by the attribute information management server and notifying the message to the user terminal.

10. A handling support method according to claim 9, wherein the object is a distributed item, and
wherein the message is a message calling attention to an item distribution action.

11. A handling support method according to claim 9, wherein the object is a ticket, and
wherein the message is a message calling attention to a use action by an object owner.

12. A handling support method according to claim 1, in which the supporting server manages a change in location of each object, comprising:
a first step of, in the user terminal, obtaining identification information of each object accommodated in a container and notifying the information along with identification information of the container to the supporting server;
a second step of, in the supporting server, updating a location of each object based on the identification information of each object and the identification information of the container, which are notified by the user terminal;
a third steps of, in the supporting server, receiving a location tracking request including the object identification information from the user terminal and then notifying the object identification information to the identification information management server;
a fourth step of, in the identification information management server, specifying the attribute information management server corresponding to the identification information notified by the supporting server and notifying the address to the supporting server;
a fifth step of, in the supporting server, notifying the object identification information included in the location tracking request to the attribute information management server having an address notified by the identification information management server;
a sixth steps of, in the attribute information management server, specifying object attribute information corresponding to the object identification information notified by the supporting server and notifying the information to the supporting server;
a seventh step of, in the supporting server, creating information including a change in location managed in correspondence with the object identification information included in the location tracking request and the object attribute information notified by the attribute information management server and notifying the information to the user terminal.

13. A handling support method according to claim 12, comprising:
when, in the supporting server, an accommodated content checking request including identification information of a container is received from the user terminal,
the third step of, in the supporting server, specifying identification information of each object set in a container whose current location is identified by the identification information and notifying the information to the identification information management server;
the fifth step, in the supporting server, notifying the specified object identification information to each of the attribute information management server having an address notified by the identification information management server; and
the seventh step, in the supporting server, creating information including each object attribute information notified by the attribute information management server and notifying the information to the user terminal.

14. A handling support system for supporting handling of an object, comprising:
at least one attribute information management server for managing attribute information of an object in correspondence with identification information given to the object;
at least one identification information management server for managing the attribute information management server in correspondence with the identification information;
at least one supporting server for supporting handling of the object in accordance with the attribute information; and
a user terminal connecting to the respective servers over a network,
wherein the user terminal has:
identification information obtaining means for obtaining identification information given to the object;
identification information notifying means for notifying the obtained identification information to the identification information management server, obtaining an address of the attribute information management server for managing the object attribute information from the identification information management server and notifying the identification information along with identification information of a user to the attribute information management server having the obtained address; and
support information notifying means for receiving, from the supporting server, support information relating to handling in accordance with the object attribute information specified by the attribute information management server and notifying the information to the user,
wherein, when the object identification information from the user terminal is received, the identification information management server specifies the attribute information management server for managing in correspondence with the identification information and notifies the address to the user terminal,
wherein, when the object identification information and the user identification information is received from the user terminal, the attribute information management server specifies object attribute information managed in correspondence with the object identification information and notifies the information along with the user identification information to the supporting server, and
wherein the supporting server has a history management database for managing an object handling history for each user and a rule management database for managing a handling rule for each object attribute information, specifies a message regarding the object handling by using the object handling history corresponding to the user identification information notified by the attribute information management server and a handling rule prepared in advance for the object attribute information notified by the attribute information management server and notifies the message to the user terminal.

15. A handling support system according to claim 14, further comprising a Radio Frequency Identification (RFID) electronic circuit chip storing identification information given to the object, which is attached to a container of the object, an attachment or the object itself and an RFID reading device including a function for communicating with the user terminal,
wherein the identification information obtaining means of the user terminal obtains, from the RFID reading device through communication, identification information read by the RFID reading device from the RFID electronic circuit chip existing in a receivable radio area.

16. A handling support system for supporting handling of an object, comprising:
at least one attribute information management server for managing attribute information of an object in correspondence with identification information given to the object;
at least one identification information management server for managing the attribute information management server in correspondence with the identification information;
at least one supporting server for supporting handling of the object in accordance with the attribute information; and
a user terminal connecting to the respective servers over a network,
wherein the user terminal has:
identification information obtaining means for obtaining identification information given to the object;
identification information notifying means fur notifying the obtained identification information to the identification information management server, obtaining an address of the attribute information management server for managing the object attribute information from the identification information management server and notifying the identification information to the attribute information management server having the obtained address; and
support information notifying means for receiving, from the supporting server, support information relating to handling in accordance with the object attribute information specified by the attribute information management server and notifying the information to the user,
wherein, when the object identification information is received from the user terminal, the identification information management server specifies the attribute information management server for managing in correspondence with the identification information and notifies the address to the user terminal, wherein, in response to receipt of the object identification information is received from the user terminal, the attribute information management server specifies object attribute information managed in correspondence with the object identification information and notifies the information along with the identification information to the supporting server, and wherein the supporting server has a history management database for managing a history of moving each object and a rule management database for managing a handling rule for each object attribute information, specifies a message regarding the object handling by using the object handling history corresponding to the object identification information notified by the attribute information management server and a handling rule prepared in advance for the object attribute information notified by the attribute information management server and notifies the message to the user terminal.

17. A handling support system for supporting handling of an object, comprising:

at least one attribute information management server for managing attribute information of an object in correspondence with identification information given to the object;

at least one identification information management server for managing the attribute information management server in correspondence with the identification information;

at least one supporting server for supporting handling of the object in accordance with the attribute information; and a user terminal connecting to the respective servers over a network, wherein the user terminal has:

identification information obtaining means for obtaining identification information given to each object accommodated in a container;

identification information notifying means for notifying the obtained object identification information along with identification information of the container to the supporting server;

a request notifying means for notifying a location tracking request including object identification information or a content checking request including container identification information to the supporting server; and support information notifying means for receiving, from the supporting server, support information relating to handling of the object and notifying the information to the user, wherein, when the object identification information is received from the supporting server, the identification information management server specifies the attribute information management server for managing in correspondence the with the identification information and notifies the address to the supporting server, wherein the attribute information management server notifies to the supporting server the object attribute information managed in correspondence with the object identification information received from the supporting server, wherein the supporting server:

has a location management database for managing a change in location of each object;

in response to notification of object identification information and container identification information is received from the user terminal, updates the location of the object managed in the location management database based on these kinds of information;

when a location tracking request including object identification information is received from the user terminal, obtains an address of the attribute information management server by notifying the object identification information to the identification information management server, obtains the object attribute information by notifying the object identification information to the attribute information management server having the obtained address, creates information including the attribute information and the change in location managed in correspondence with the object identification information and notifies the information to the user terminal; and when a content checking request including identification information of a container is received from the user terminal, specifies each object identification information set to the container whose current location is identified by the container identification information, obtaining an address of the attribute information management server by notifying the information to the identification information management server, obtains the object attribute information by notifying the each object identification information to the attribute information management server having the obtained address, creates information including the attribute information and notifies the information to the user terminal.

* * * * *